Oct. 10, 1939.    G. SLAYTER    2,175,226
INSULATING AND WEATHER RESISTANT MATERIALS
Filed Dec. 30, 1936
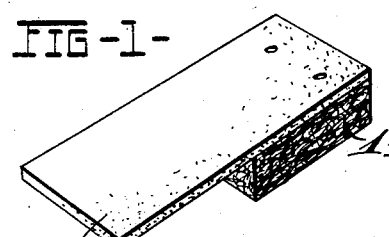
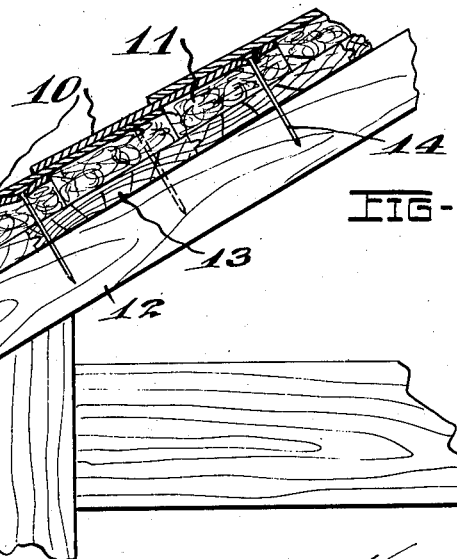
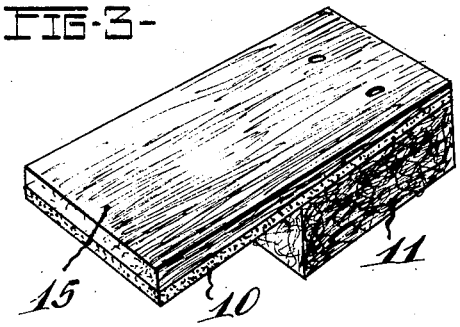
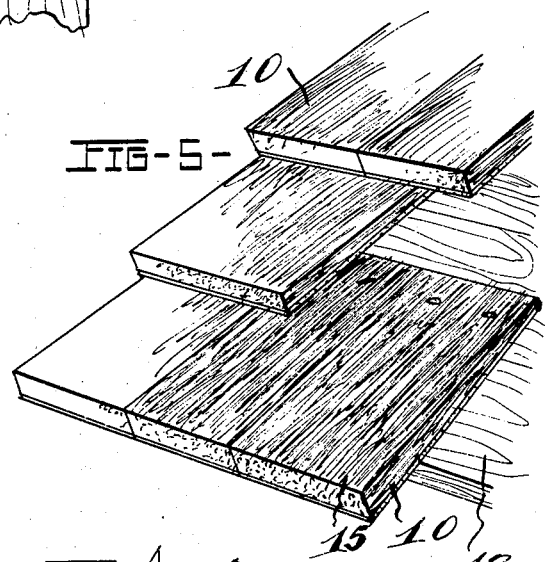
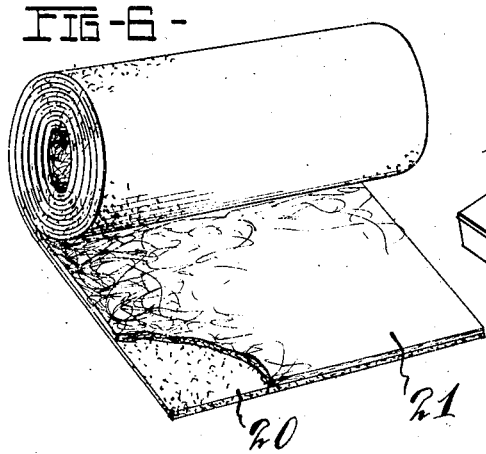
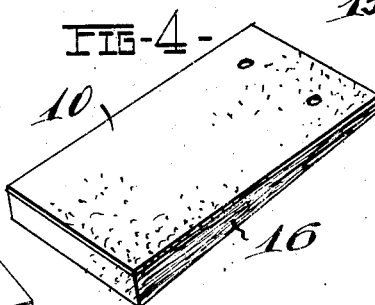
INVENTOR
BY *James Slayter*
*Rule & Hoge* ATTORNEYS.

Patented Oct. 10, 1939

2,175,226

UNITED STATES PATENT OFFICE 2,175,226

INSULATING AND WEATHER RESISTANT MATERIALS

Games Slayter, Newark, Ohio, assignor, by mesne assignments, to Owens-Corning Fiberglas Corporation, a corporation of Delaware Application December 30, 1936, Serial No. 118,331

7 Claims. (Cl. 108—8)

My invention relates to building materials and products having high insulating value and weather resistant properties. Such products may be in the form of shingles particularly adapting them for use as roofing materials. They may also be of other approved forms, serving for use in other situations, and generally as a covering material for the exterior walls of buildings and for surfaces exposed to the weather.

The invention in its preferred form comprises the use of inorganic fibrous material in matted form, preferably glass wool, in combination with a suitable backing of weather-proof material such as tarred paper or the like, so arranged and combined as to take advantage to the fullest extent of the high insulating value and other desirable properties of the fibrous glass or like material.

Many fabrications of a fibrous material and a binder have been produced commercially heretofore but in all of these the fibrous material has been completely impounded in the binder. With this combination, the heat conductance of the product is very nearly the same as that of the binder alone since the latter provides a continuous phase for the transmission of heat. Such a product is comparatively inefficient from the standpoint of heat insulation since the heat conductance of the binder is much greater than that of the fibrous material so that the heat insulating value of the latter is lost to a large extent.

An object of my invention is to overcome this objection and provide a product adapted for the purposes indicated, in which the fibrous material retains its insulating value. I have discovered that a surface consisting of glass fibers presents an excellent means for reflecting heat and like radiation. By combining a mat of glass fibers presenting an exposed surface, with a suitable backing such, for example, as a flexible moisture-proof felt or paper or a semi-rigid base of wood, metal or other material, the glass fibers being bonded thereto by means of a thermoplastic adhesive, an effective weather resistant product is obtained in which the heat and/or like radiations are prevented from coming in contact with the thermoplastic adhesive.

A further object of the invention is to provide a roofing material in the form of shingles or other suitable form, in which a semi-rigid base consisting of wood or other suitable material of sheet-like formation has secured thereto on one side thereof a mat or layer of glass wool or the like.

Other objects of the invention will appear hereinafter.

Referring to the accompanying drawing:

Fig. 1 is a perspective view of a shingle constructed in accordance with my invention;

Fig. 2 is a fragmentary sectional elevation of a roof structure comprising shingles of the form shown in Fig. 1;

Figs. 3 and 4 are perspective views showing modified forms of shingles;

Fig. 5 is a fragmentary perspective view of a roof comprising shingles having an exposed surface layer of glass wool or the like; and Fig. 6 is a perspective view of a roll of roofing material comprising a layer of matted glass fibers on one surface thereof.

Referring particularly to Fig. 1, I have shown a shingle 10 which may be of conventional shape and thickness and which comprises a base of wood, metal, composite material, or other suitable substance or material. Secured to the surface of the base 10 is a mat or pad 11 consisting of matted fibrous material as, for example, glass wool, preferably composed of long fine fibers in loosely matted form. In making the article, the base 10 may be coated with a thermoplastic adhesive substance such as asphalt, tar, or other thermoplastic, weather-proof binding material or cement. The pad 11 is applied to the base 10 while the coating material is in a plastic condition so that the fibers are partially embedded in the plastic. When the latter has hardened the pad is securely bonded to the shingle or base 10.

Fig. 2 illustrates a roof shingled with the form of shingles shown in Fig. 1. The roof may be of conventional construction comprising the rafters 12 and sheeting or boards 13. The shingles may be applied in the usual manner in horizontal rows, each row overlapping the next lower row of shingles. The shingles are secured to the roof by nails 14 or other approved fastening means. The glass wool mats or bats 11 are preferably coextensive in width with the shingle and equal in length to the exposed width of each row of shingles, so that when the shingles are applied to the roof the pads 11 have their ends and sides abutting so as to form a practically continuous, unbroken mat or blanket of glass wool beneath the shingles. This mat interposed between the exposed shingles and the sheeting 13 provides an exceptionally effective insulation which does not permit transmission through the roof of more than a small fraction of the heat which would be transmitted with a roof of conventional construction and materials, or a roof comprising glass wool, rock wool, asbestos, or other inorganic fibrous material embedded or impounded in a binder or base consisting of asphalt or other waterproof material. It will be noted that a roof constructed as in Fig. 2 has the appearance of a conventional shingle roof, the fibrous mat being completely concealed from view and protected from exposure to the elements.

Fig. 3 illustrates a modification in which the shingle has applied thereto and forming a part thereof, an upper layer or mat 15 of inorganic fibers such as glass wool. This upper mat 15 is preferably coextensive in length and width with the shingle base 10 and may be secured thereto in the same manner as the pad 11 as above described.

The fibers comprising the exposed mat 15 may be arranged by combing the mat or otherwise, to extend substantially parallel with the underlying base and in a direction lengthwise of the shingle. When thus arranged they shed water readily, serving as a thatching material. As shown in Fig. 3 the upper mat 15 is tapered, being of greater thickness at the lower end of the shingle than at the upper end, and in this respect similar in conformation to conventional wood shingles. When the shingles are applied to a roof the exposed portions of the mats 15 are of greater thickness than the concealed portions. Fig. 5 illustrates a roof constructed with shingles such as shown in Fig. 3 but with the lower wool pads 11 omitted.

Fig. 4 illustrates a shingle having a pad 16 of matted glass fibers or the like applied to the lower surface of the base 10. In this instance the fibrous pad covers the entire under surface of the shingle. It may also be of tapered formation corresponding to that of the pad 15 shown in Fig. 3. It will be understood that, if desired, the shingle may be formed with upper and lower pads 15 and 16 covering the entire upper and lower surfaces respectively of the shingle.

The glass wool comprising the pads 11, 15 and 16 may consist of extremely fine glass fibers, the diameters of which may be of the order of 4 or 5 microns. These fibers may be of considerable length ranging up to several inches or more. Glass wool comprising such fibers is of exceptionally high heat insulating value, and is extremely light in weight. The fibers may be loosely matted together into a mat having great flexibility, compressibility and resilience combined with a high degree of mass integrity and tensile strength. These properties insure that the mats or pads when used as an under coating such as shown in Fig. 2 will retain their position, completely filling the insulating space beneath the shingles and preventing settling. The glass fibers possess other valuable properties particularly adapting them for use as a roofing material. Owing to their chemical inertness and their resistance to the action of moisture, they are practically indestructible by the elements. They are also free from attacks of rodents, insects and the like.

When used for coating the upper surfaces of the shingles, the fibers may be comparatively coarse if desired.

Fig. 6 illustrates a roll of covering material which may comprise a flexible moisture-proof base or backing 20 consisting of felt, paper or other fibrous material impregnated or treated with asphalt or other water-proofing and bonding material. Applied to one or both surfaces of the base 20 is a layer 21 of matted glass fibers or the like such as heretofore described. This material may be used as a flat covering for roofs, exposed walls and the like. The backing 20 may itself comprise a web or mat of fine glass fibers impregnated with or embedded in a body or base of impervious material having weather resistant properties and which may also be a thermoplastic, permitting the application thereto of the surface layer 21 of fibrous material. The fine glass fibers, when embedded in the backing 20 in the manner just described, give to such backing great tensile strength, toughness and mass integrity. The shingles 10 may also comprise an impervious material having matted fibrous glass embedded therein to give it strength and permanency. In one such form, it may comprise an asphalt base of sheet formation and a mat of fine glass fibers having open air-filled interstices overlying and partially embedded in said base.

Modifications may be resorted to within the spirit and scope of my invention.

I claim:
1. The combination of a shingle, and a mat of glass fibers having open air-filled interstices secured to and covering the upper surface of the shingle.

2. The combination of a shingle, and a mat of glass fibers secured to and covering the upper surface of the shingle, the fibers of said mat extending mainly in directions lengthwise of the shingle.

3. A roof comprising shingles arranged in horizontal rows or courses, the butts of the shingles in each row being spaced upwardly from those of the next subjacent row of shingles in conventional form, and heat insulating mats of inorganic fibrous material having open air-filled interstices attached to the under surfaces of the shingles, the length of said mats being equal to the distance between the butts of adjacent rows of shingles and the width of the mats equal to the width of the shingles, the sides and ends of the mats on adjoining shingles abutting so as to form a practically continuous, unbroken mat or blanket of said fibrous material beneath the shingles.

4. A roof comprising shingles arranged in horizontal rows or courses, the butts of the shingles in each row being spaced upwardly from those of the next subjacent row of shingles in conventional form, anld heat insulating mats of inorganic fibrous material having open air-filled interstices attached to the under surfaces of the shingles, said mats being of such size, shape, and position as to abut each other and form in effect a continuous mat or blanket underlying substantially the entire shingled surface of the roof.

5. A roof comprising shingles arranged in horizontal rows or courses, the butts of the shingles in each row being spaced upwardly from those of the next subjacent row of shingles in conventional form, heat insulating mats of inorganic fibrous material having open air-filled interstices attached to the under surfaces of the shingles, said mats being of such size, shape, and position as to abut each other and form in effect a continuous mat or blanket underlying substantially the entire shingled surface of the roof, and glass fibers attached to the upper surfaces of the shingles and forming a covering for the exposed portions thereof.

6. A shingle comprising a base of impervious, weather resistant material and fine glass fibers embedded in and interspersed through said material, said material being heat plastic, and an outside surface layer of glass fibers having open air-filled interstices covering said base, portions of the fibers being embedded therein and forming a bond between said base and the exposed layer of fibers.

7. The combination of a roofing shingle of greater length than width, and a resilient mat of glass wool having open air-filled interstices, said mat attached to the under surface of the shingle and being coextensive in width with the shingle and extending from the upper end of the shingle toward the lower end and terminating at a point approximately midway between the upper and lower ends of the shingle, the size and arrangement of the mat being such that when the shingle is conventionally built into a roof with like shingles, the sides and ends of said mat abut those of the adjoining mats on the surrounding shingles so that said mat is completely surrounded by and merged into the mats of the surrounding shingles to form a practically continuous unbroken mat or blanket of glass wool beneath the shingles.

GAMES SLAYTER.